(12) United States Patent
Lohmann et al.

(10) Patent No.: US 9,660,312 B2
(45) Date of Patent: May 23, 2017

(54) METAL/AIR BATTERY WITH GAS SEPARATION NANOSTRUCTURE

(71) Applicant: Robert Bosch GmbH, Stuttgart (DE)

(72) Inventors: Timm Lohmann, Mountain View, CA (US); John F. Christensen, Mountain View, CA (US); Boris Kozinsky, Waban, MA (US); Paul Albertus, Mountain View, CA (US); Roel Sanchez-Carrera, Sommerville, MA (US)

(73) Assignee: Robert Bosch GmbH, Stuttgart (DE)

( * ) Notice: Subject to any disclaimer, the term of this patent is extended or adjusted under 35 U.S.C. 154(b) by 738 days.

(21) Appl. No.: 13/921,704

(22) Filed: Jun. 19, 2013

(65) Prior Publication Data

US 2014/0234731 A1    Aug. 21, 2014

Related U.S. Application Data

(60) Provisional application No. 61/661,729, filed on Jun. 19, 2012.

(51) Int. Cl.
| | |
|---|---|
| *H01M 4/94* | (2006.01) |
| *H01M 12/08* | (2006.01) |
| *H01M 12/00* | (2006.01) |
| *B01D 67/00* | (2006.01) |
| *B01D 71/02* | (2006.01) |
| *H01M 4/38* | (2006.01) |
| *H01M 12/02* | (2006.01) |
| *H01M 8/04007* | (2016.01) |

(52) U.S. Cl.
CPC ........ *H01M 12/08* (2013.01); *B01D 67/0072* (2013.01); *B01D 71/024* (2013.01); *H01M 4/94* (2013.01); *H01M 12/00* (2013.01); *H01M 4/382* (2013.01); *H01M 8/04037* (2013.01); *H01M 12/02* (2013.01)

(58) Field of Classification Search
CPC ................................ H01M 4/382; H01M 4/94
USPC .................................................. 429/408, 403
See application file for complete search history.

(56) References Cited

U.S. PATENT DOCUMENTS

| | | | | |
|---|---|---|---|---|
| 2002/0025471 | A1* | 2/2002 | Velez | H01M 2/0277 |
| | | | | 429/112 |
| 2005/0252771 | A1* | 11/2005 | Wiedenmann | G01N 27/4065 |
| | | | | 204/426 |

(Continued)

FOREIGN PATENT DOCUMENTS

JP    2008-034290 A    2/2008

OTHER PUBLICATIONS

International Search Report and Written Opinion corresponding to PCT Application No. PCT/US2013/046623, mailed Aug. 22, 2013 (9 pages).

(Continued)

*Primary Examiner* — Mark F Huff
*Assistant Examiner* — Monique Wells
(74) *Attorney, Agent, or Firm* — Maginot Moore & Beck LLP (57) ABSTRACT

A metal/air battery electrochemical cell in one embodiment includes a negative electrode, a positive electrode, an oxygen supply, and a closed oxygen conducting membrane less than about 50 microns thick located between the oxygen supply and the positive electrode.

20 Claims, 5 Drawing Sheets

(56) References Cited

U.S. PATENT DOCUMENTS

| | | | |
|---|---|---|---|
| 2006/0188774 A1* | 8/2006 | Niu | H01M 4/8846 |
| | | | 429/409 |
| 2007/0141431 A1* | 6/2007 | Wang | H01M 2/025 |
| | | | 429/9 |
| 2008/0131750 A1* | 6/2008 | Striker | H01M 8/1246 |
| | | | 429/482 |
| 2010/0291443 A1 | 11/2010 | Farmer | |
| 2011/0076542 A1 | 3/2011 | Farmer | |
| 2011/0274977 A1 | 11/2011 | Nakura | |
| 2012/0178015 A1* | 7/2012 | Quek | H01M 8/1246 |
| | | | 429/482 |

OTHER PUBLICATIONS

Mitchell et al., "All-carbon-nanofiber electrodes for high-energy rechargeable Li-02 batteries", Energy & Environmental Science; 2011; pp. 2952-2958; vol. 4; The Royal Society of Chemistry; Massachusetts (7 pages).

Wachsman et al., "Lowering the Temperature of Solid Oxide Fuel Cells", Science Magazine; 2011; pp. 935-939; vol. 334; Maryland (5 pages).

\* cited by examiner

METAL/AIR BATTERY WITH GAS SEPARATION NANOSTRUCTURE

This application claims the benefit of U.S. Provisional Application No. 61/661,729, filed on Jun. 19, 2012, the entire contents of which are herein incorporated by reference.

TECHNICAL FIELD

This invention relates to batteries and more particularly to metal/air based batteries.

BACKGROUND

Figure 1:
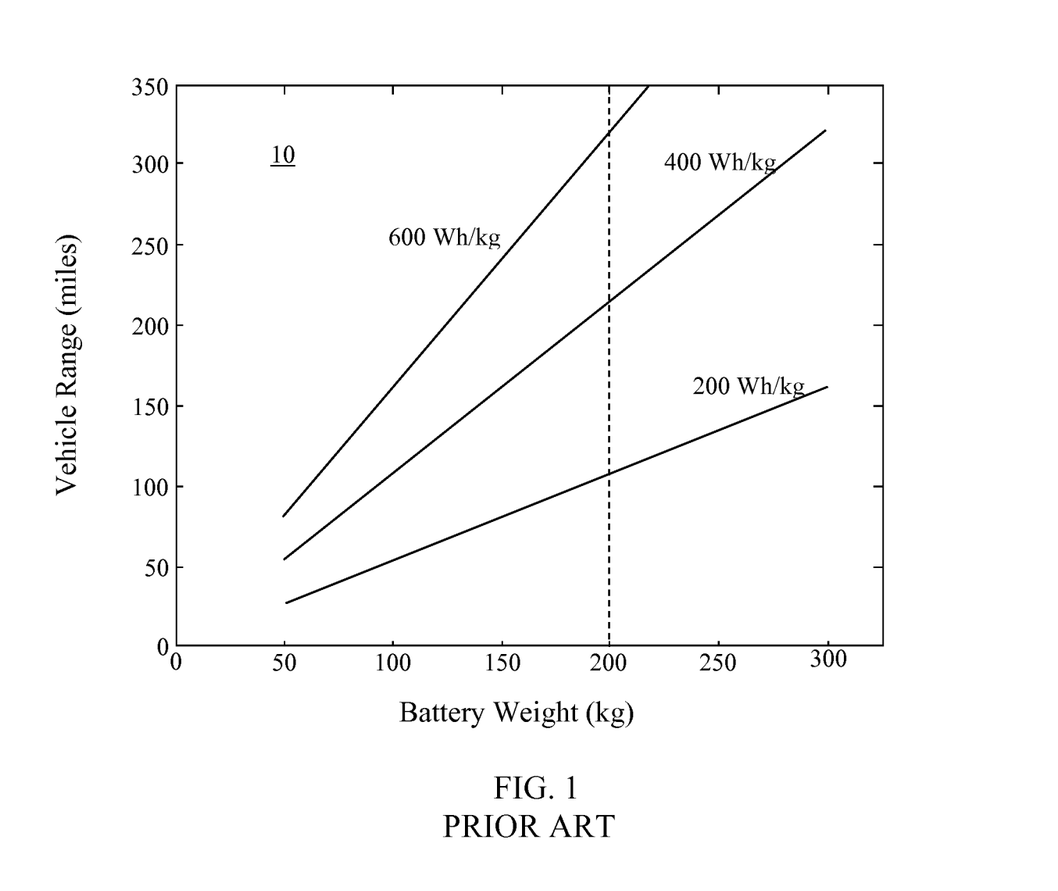
FIG. 1 depicts a plot showing the relationship between battery weight and vehicular range for various specific energies.

FIG. 1 depicts a chart 10 showing the range achievable for a vehicle using battery packs of different specific energies versus the weight of the battery pack. In the chart 10, the specific energies are for an entire cell, including cell packaging weight, assuming a 50% weight increase for forming a battery pack from a particular set of cells. The U.S. Department of Energy has established a weight limit of 200 kg for a battery pack that is located within a vehicle. Accordingly, only a battery pack with about 600 Wh/kg or more can achieve a range of 300 miles.

Figure 2:
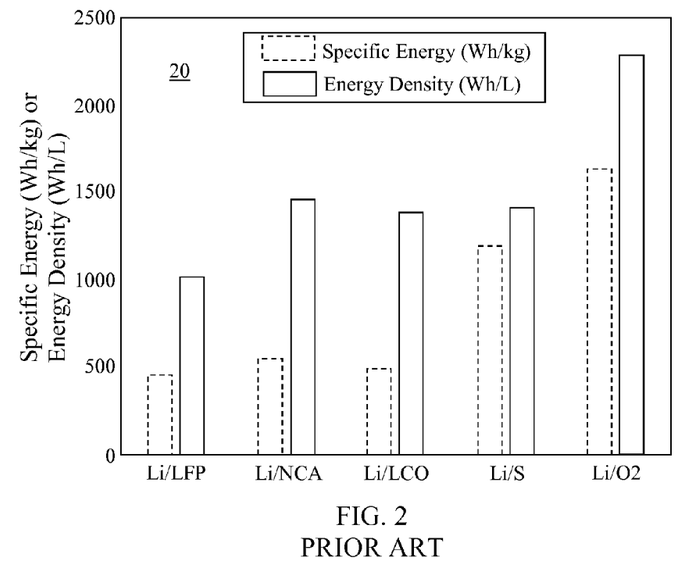
FIG. 2 depicts a chart of the specific energy and energy density of various lithium-based cells.

Various lithium-based chemistries have been investigated for use in various applications including in vehicles. FIG. 2 depicts a chart 20 which identifies the specific energy and energy density of various lithium-based chemistries. In the chart 20, only the weight of the active materials, current collectors, binders, separator, and other inert material of the battery cells are included. The packaging weight, such as tabs, the cell can, etc., are not included. As is evident from the chart 20, lithium/air batteries, even allowing for packaging weight, are capable of providing a specific energy >600 Wh/kg and thus have the potential to enable driving ranges of electric vehicles of more than 300 miles without recharging, at a similar cost to typical lithium ion batteries. While lithium/air cells have been demonstrated in controlled laboratory environments, a number of issues remain before full commercial introduction of a lithium/air cell is viable as discussed further below.

Figure 3:
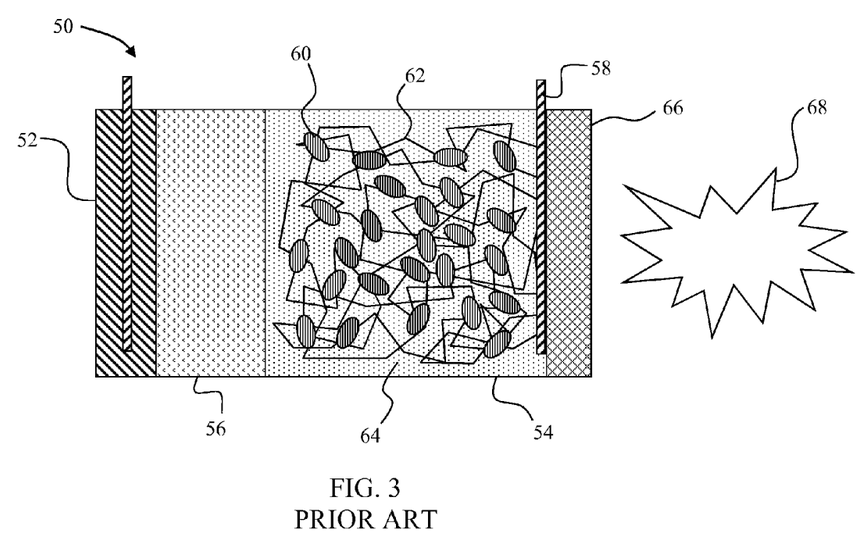
FIG. 3 depicts a prior art lithium-air (Li/air) cell including two electrodes, a separator, and an electrolyte.

A typical lithium/air electrochemical cell 50 is depicted in FIG. 3. The cell 50 includes a negative electrode 52, a positive electrode 54, a porous separator 56, and a current collector 58. The negative electrode 52 is typically metallic lithium. The positive electrode 54 includes carbon particles such as particles 60 possibly coated in a catalyst material (such as Au or Pt) and suspended in a porous, electrically conductive matrix 62. An electrolyte solution 64 containing a salt such at $LiPF_6$ dissolved in an organic solvent such as dimethyl ether or $CH_3CN$ permeates both the porous separator 56 and the positive electrode 54. The $LiPF_6$ provides the electrolyte with an adequate conductivity which reduces the internal electrical resistance of the cell 50 to allow a high power.

A portion of the positive electrode 52 is enclosed by a barrier 66. The barrier 66 in FIG. 3 is configured to allow oxygen from an external source 68 to enter the positive electrode 54. The wetting properties of the positive electrode 54 prevent the electrolyte 64 from leaking out of the positive electrode 54. Oxygen from the external source 68 enters the positive electrode 54 through the barrier 66 while the cell 50 discharges and oxygen exits the positive electrode 54 through the barrier 66 as the cell 50 is charged. In operation, as the cell 50 discharges, oxygen and lithium ions are believed to combine to form a discharge product $Li_2O_2$ or $Li_2O$ in accordance with the following relationship:

The positive electrode 54 in a typical cell 50 is a lightweight, electrically conductive (~Ωcm) material which has a porosity of greater than 80% to allow the formation and deposition/storage of $Li_2O_2$ in the cathode volume. The ability to deposit the $Li_2O_2$ directly determines the maximum capacity of the cell. In order to realize a battery system with a specific energy of 600 Wh/kg or greater, a plate with a thickness of 100 μm must have a capacity of about 20 $mAh/cm^2$.

Materials which provide the needed porosity include carbon black, graphite, carbon fibers, and carbon nanotubes. There is evidence that each of these carbon structures undergo an oxidation process during charging of the cell, due at least in part to the harsh environment in the cell (pure oxygen, superoxide and peroxide ions, formation of solid lithium peroxide on the cathode surface, and electrochemical oxidation potentials of >3V (vs. $Li/Li^+$)).

Some lithium/air cells contain gas-diffusion electrodes based on barriers 66 made from porous carbon materials like carbon black, graphite, graphene, carbon fibers or carbon nanotubes. The cells are typically operated with pure oxygen. For practical applications one main challenge is the gas supply, because gas cylinders containing pure oxygen will probably not be carried in electric vehicles due to safety reasons.

State-of-the-art gas separation membranes are typically based on polymers, zeolites or molecular sieves which are not 100% gas selective. In order to allow high cycle life (>>1000) of a lithium air cell the concentration of relevant contaminants (i.e. $CO_2$, $H_2O$, $N_2$) in the supplied oxygen must be below 10 ppm. Therefore a gas separation technique is needed which is almost 100% selective regarding oxygen vs. air.

The needed selectivity may be realized by solids which are highly anion-selective due to a distinct solid-state transport mechanism. Examples of this type of material are complex transition metal oxides with oxygen vacancies like $La_{0.6}Sr_{0.4}CoO_{3-d}$ and $Ba_{0.5}Sr_{0.5}Co_{0.8}Fe_{0.2}O_{3-d}$. Typically these materials can only be processed as membranes in thin-film processes with a thickness between ~0.5 and 2 mm. In order to allow anion transport through those membranes one needs to apply high temperatures up to 1300 K. Furthermore the absolute anion-current is limited by the relatively large thickness of the membranes and by the limited rate of surface ionization of oxygen, which is required to form the transportable anion.

In addition to the foregoing difficulties, the oxygen separation layer has to allow a sufficient gas flow (min 5 $μl/s·cm^2$) in order to supply the cell with enough oxygen for typical current densities of about 40 $mA/cm^2$. Gas separation layers based on polymer membranes and silicon oil infiltrated porous structures are known and mainly used for air-water separation. These membranes are very thick (several microns) and do not allow high gas flow rates, which limits the maximum discharge power when used for metal-air batteries. Pressure swing adsorption is an engineering solution to separate $N_2$ from air. This technology requires a power supply and is therefore not suitable to be incorporated in a battery. All these technologies are not able to produce oxygen with contaminants below 10 ppm, which is crucial for a reversible operation of the lithium/oxygen or metal/ oxygen battery.

What is needed therefore is a barrier which can separate oxygen from air. A further need exists for a barrier that allows a sufficient amount of oxygen to be introduced into the battery.

SUMMARY

In one embodiment, a metal/air electrochemical cell includes a negative electrode, a positive electrode, an oxygen supply, and a closed oxygen conducting membrane less than about 50 microns thick located between the oxygen supply and the positive electrode.

In another embodiment, a method of forming a metal/air electrochemical cell includes providing a negative electrode, providing a positive electrode, providing an oxygen supply, forming a closed oxygen conducting membrane less than about 50 microns thick, and positioning the closed oxygen conducting membrane between the oxygen supply and the positive electrode.

DETAILED DESCRIPTION

Figure 4:
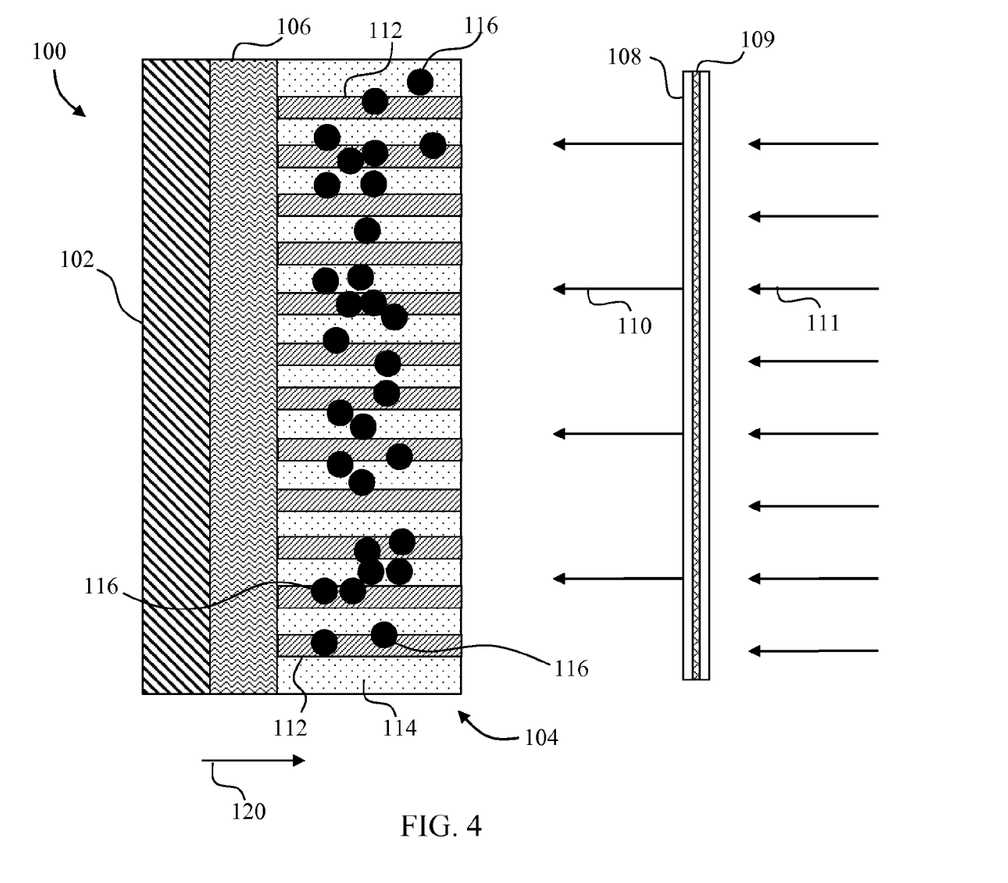
FIG. 4 depicts a Li/air electrochemical cell including a three dimensional silicon carbon (SiC) cathode structure and an oxygen conducting barrier in accordance with principles of the invention.

A schematic of an electrochemical cell 100 is shown in FIG. 4. The electrochemical cell 100 includes a negative electrode 102 separated from a positive electrode 104 by a porous separator 106. The separator 106 prevents the negative electrode 102 from electrically connecting with the positive electrode 104. The negative electrode 102 may be formed from lithium metal or a lithium-insertion compound (e.g., graphite, silicon, tin, LiAl, LiMg, $Li_4Ti_5O_{12}$), although Li metal affords the highest specific energy on a cell level compared to other candidate negative electrodes.

An oxygen conducting layer 108 allows oxygen (indicated by the arrows 110) to enter and exit the positive electrode 104 while other components of the air (indicated by the arrows 111) remain outside of the positive electrode 104. The oxygen conducting layer 108 includes a relatively thick membrane (>>50 nm) consisting of an oxygen conducting material. In order to allow sufficient gas transport through the membrane, a heating grid 109 is embedded in the membrane volume of some embodiments. The oxygen conducting layer 108 is included in the cell stack between the air supply side and the cathode matrix. In one embodiment, the oxygen conducting material is nanostructured yttria-stabilized zirconia (YSZ) in Nernst cell geometry to separate oxygen from air. In other embodiments, the oxygen conducting material is stabilized bismuth oxides, doped ceria, or lanthanum oxides.

YSZ is typically deposited using thin-film ceramic techniques, CVD, laser deposition or sputtering. All of these techniques are limited regarding the minimal film-thickness, uniformity, and defect density. The typical film thickness is on the order of microns. This means the material has to be heated up to 1200 K depending on the desired anionic current, because the solid-state conduction mechanism in YSZ is temperature dependent. Several investigations in literature show, that YSZ nanostructures (film thickness below 100 nm) have potentially higher conductivity at lower temperatures. Values reported are around $2*10^{-3}$ S/m at 623 K. The critical issue with thin layers is that defects play a more important role the thinner the film gets.

Figure 5:
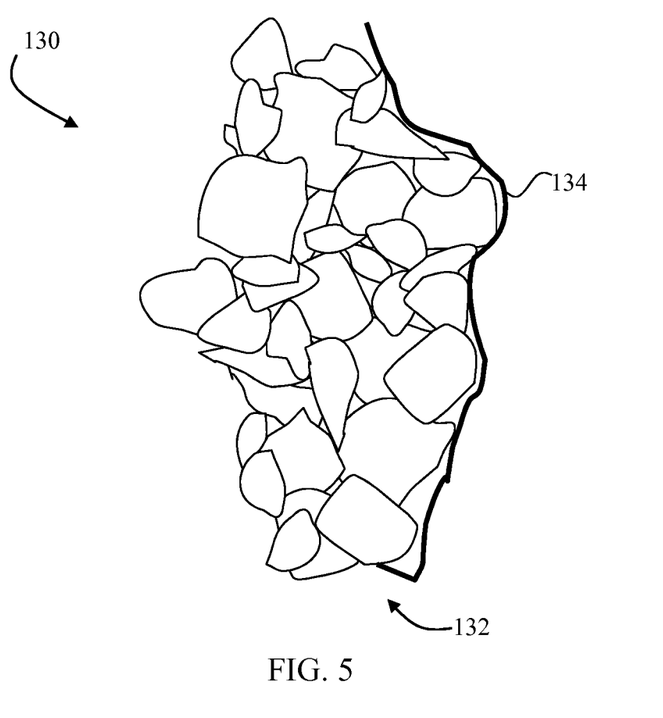
FIG. 5 depicts a Li/air electrochemical cell including a conformal oxygen conducting barrier in accordance with principles of the invention.

Consequently, in one embodiment, atomic layer deposition (ALD) is used in order to create YSZ nanostructures conformally and with a low defect density as depicted in FIG. 5. FIG. 5 depicts a portion of an electrochemical cell 130 which includes a porous cathode structure 132. An oxygen conducting layer 134 comprises a conformal atomic layer deposited (ALD) coating.

ALD-grown YSZ has been studied already for micro-fuel cells in literature. Further reduction of the film thickness and optimization of the material's crystal structure by doping and annealing can increase the conductivity even further. In one embodiment, the conductivities are on the order of $10^{-3}$ S/m to $10^{-2}$ S/m, and the can be achieved in an oxygen conducting layer 134 formed at temperatures below 500 K. These conductivities are equivalent to an oxygen flow of about 25 µl/s·cm$^2$ and corresponding current densities of the cell of about 200 mA/cm$^2$. These values are significantly higher than the minimum cell requirements stated above.

Thus, by using ALD for the ceramic oxygen conductor, a thin (<50 nm), conformal, and closed membrane can be deposited on the gas diffusion electrode 132 of the lithium air cell. The oxygen conducting layer 134 will have the oxygen conductivity as discussed above and therefore be suitable for a typical lithium/oxygen cell and potentially allows oxygen transport at room temperature. The gas separation happens directly at the particle surface. The oxygen diffuses into the porous cathode structure 132 after separation from air and reacts with Li-ions coming from the anode/electrolyte side (not shown) in a manner similar to the embodiment of FIG. 4.

Returning to FIG. 4, the positive electrode 104 in this embodiment includes a number of cathodes 112 which are immersed in an electrolyte 114. Metal oxide portions 116, which in one embodiment are $Li_2O_2$ portions, are also located within the positive electrode 104. This material is also used in some of the embodiments of FIG. 5.

The electrolyte solution 114 is present in the positive electrode 104 and in some embodiments in the separator 106. In the exemplary embodiment of FIG. 4, the electrolyte solution 114 includes a salt, $LiPF_6$ (lithium hexafluorophosphate), dissolved in an organic solvent mixture. The organic solvent mixture may be any desired solvent. In certain embodiments, the solvent may be dimethyl ether (DME), acetonitrile (MeCN), ethylene carbonate, or diethyl carbonate. This electrolyte solution 114 is also used in some of the embodiments of FIG. 5.

The air 110 is provided by the atmosphere or any vessel suitable to hold oxygen and other gases supplied to and emitted by the positive electrode 104. In embodiments wherein a reservoir other than the atmosphere is used, a flow field, hose, or other conduit may be used to direct air from the reservoir to the positive electrode 104. Various embodiments of reservoirs are envisioned, including rigid tanks, inflatable bladders, and the like.

The electrochemical cell 100 may discharged with lithium metal in the negative electrode 102 ionizing into a $Li^+$ ion with a free electron $e^-$. $Li^+$ ions travel through the separator 106 in the direction indicated by arrow 120 toward the positive electrode 104. Oxygen is supplied from the reservoir through the gas diffusion layer 108 as indicated by the arrows 110. Free electrons $e^-$ flow into the positive electrode 104 and through the cathodes 112.

The cathodes 112 provide a porous cathode structure including an inert material such as SiC, ZnO, Ir, Ta, Au, Pt, Ti, and the like. Because the cathode material is highly inert, the cell 100 exhibits increased cycleability and lifetime. In various embodiments, the cathodes 112 are a 3D structure like a network of channels, pores, or cavities. In other embodiments, the cathodes 112 are a network of fibers, wires, or tubes. The cathodes 112 in another embodiment are structured as a dense "lawn" of nano fibers or nanotubes on a conductive substrate.

Figure 6:
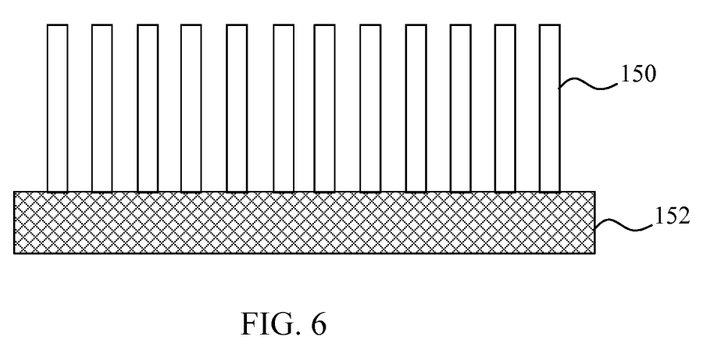
FIG. 6 depicts a substrate on which nanowires have been formed which can be used to form silicon carbide cathode structures.

The cathodes 112 in one embodiment are formed by conversion of silicon, carbon, or silica into SiC. Referring initially to FIG. 6, a lawn of nano-fibers is formed in one embodiment by providing a number of nanowires 150. The nanowires 150 in FIG. 6 are grown on a support layer 152 using a nickel catalyst using any desired process. The nanowires 150 in one embodiment are carbon nanowires. In another embodiment, the nanowires 150 are silicon nanowires.

Figure 7:
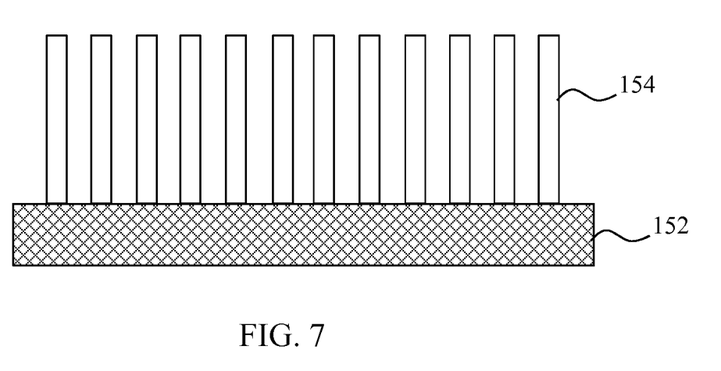
FIG. 7 depicts a silicon carbide cathode structure formed using the substrate and nanowires of FIG. 6.

The nanowires 150 are then exposed to a carbon or silicon precursor gas such as alkane, silane gases or other volatile organo-carbon/organo-silicon compounds at a high temperature. For silicon precursors, a temperature on the order of 2000° C. is used while for carbon precursors a temperature of about 1000° C. is used. The high temperature exposure causes the silicon/carbon structure to be converted into silicon carbide, resulting in the silicon carbide lawn 154 depicted in FIG. 7. An oxygen conductor is then provided either as a separately formed layer, or as a layer conformally deposited on the support layer 152.

Figure 8:
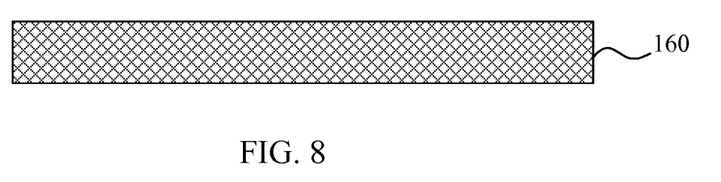
FIG. 8 depicts a porous silica structure such as silica Aerogel which can be used to form silicon carbide cathode structures.
Figure 9:
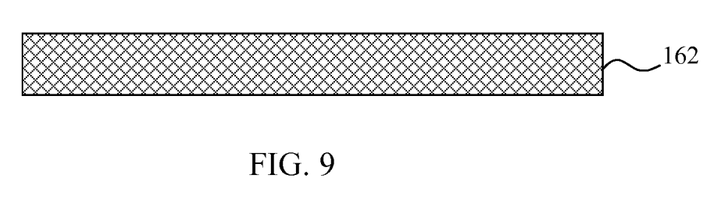
FIG. 9 depicts a silicon carbide cathode structure formed using the porous silica structure of FIG. 8.

In another embodiment, a porous silicon carbide structure is formed by first providing a highly porous ultralight silica structure. One such structure is available in the form of silica Aerogel. Aerogel exhibits superior mechanical stability and ultra-large surface area at low mass. Fabrication of a cathode using Aerogel begins by providing a slab 160 of Aerogel as depicted in FIG. 8. The porous silica slab 160, when formed from Aerogel, can be used as a stand-alone structure without a support layer 152. Conversion of the silica slab 160 is performed using a carbon precursor (CH4 or similar hydrocarbons, aromatics etc. . . . ). The slab 160 is subjected to the selected carbon precursor at a temperature of about 1000° C. The high temperature exposure causes the silica Aerogel structure to be converted into silicon carbide, resulting in the silicon carbide structure 162 depicted in FIG. 9. The silicon carbide structure in some embodiments is then doped using nitrogen or phosphorous in a subsequent step in order to adjust the electrical conductivity. An oxygen conductor is then provided either as a separately formed layer, or as a layer conformally deposited on the silicon carbide structure 162.

The silicon carbide cathode structures described above in some embodiments include inert material like SiC, ZnO, Ir, Ta, Au, Pt, and Ti. The resulting silicon carbide cathode structure is highly inert leading to an increased cycleability and lifetime. The silicon carbide cathode structures in different embodiments are a network of channels/pores/cavities or a fiber/wire/tube network, or a dense "lawn" of nano fibers, nano wires or nano tubes on a conductive substrate.

In the various embodiments, the silicon carbide cathode structures exhibit a significantly reduced charge potential compared to conventional carbon cathodes. Moreover, the silicon carbide cathode has a similar or higher discharge capacity and conductivity (rate capability) than state-of-the-art cathodes based on carbon. Furthermore, the design/process for the silicon carbide cathode structures described above can be easily integrated in existing cell production process.

The above described oxygen conductor layers and methods of making a cathode or electrochemical cell, provides a protective coating which is a good and highly selective oxygen conductor directly applied or positioned on the "air side" of the metal-air battery. The above described oxygen conductor layers provide an anion-selective membrane (up to 50 nm) for oxygen separation from air. The separation removes contaminants from oxygen below at least 100 ppm, typically below 10 ppm. In contrast to state-of-the-art oxygen conductors the above described embodiments require no or only low heating (below 500 K) of the active anion-selective membrane while allowing operation of the lithium/oxygen or metal/oxygen cell at reasonable currents.

In some embodiments including a conformal oxygen conductor layer, the oxygen conductor layer is applied to the working electrode of the cell directly. In some embodiments wherein the conformal oxygen conductor layer is provided as a separate membrane, the conformal oxygen conductor layer is part of a separation system but outside of the cell (e.g. within the battery pack or attached to the battery pack).

The above described embodiments exhibit a significant robustness in humid, $CO_2$ containing, $NO_x$ containing or otherwise contaminated air. Moreover, the above described designs and processes can be easily integrated in existing cell production processes.

While the invention has been illustrated and described in detail in the drawings and foregoing description, the same should be considered as illustrative and not restrictive in character. Only the preferred embodiments have been presented and all changes, modifications and further applications that come within the spirit of the invention are desired to be protected.

The invention claimed is:
1. A metal/air battery comprising:
   a negative electrode;
   a positive electrode;
   an oxygen supply; and
   a closed oxygen conducting membrane less than about 50 microns thick located between the oxygen supply and the positive electrode, wherein the closed oxygen conducting membrane is functionally adjacent to the positive electrode.

2. The battery of claim 1, wherein the closed oxygen conducting membrane is a conformally formed closed oxygen conducting membrane.

3. The battery of claim 2, wherein the closed oxygen conducting membrane is formed by atomic layer deposition.

4. The battery of claim 3, wherein the closed oxygen conducting membrane is a nanostructured yttria-stabilized zirconia in a Nernst cell geometry.

5. The battery of claim 2, wherein:
the positive electrode includes a porous structure; and
the closed oxygen conducting membrane is formed conformally on the porous structure.

6. The battery of claim 4, wherein the oxygen supply is a vessel configured to hold a gas.

7. The battery of claim 4, wherein:
the positive electrode includes a porous structure; and
the closed oxygen conducting membrane is spaced apart from the porous structure.

8. The battery of claim 4, wherein the positive electrode includes a porous structure formed from Pt, Au, Ir, Ta, Ti or a similar inert material.

9. The battery of claim 4, wherein the positive electrode includes a silicon carbide porous structure formed from a silica Aerogel.

10. The battery of claim 4, wherein the positive electrode includes a silicon carbide structure formed from nanowires.

11. The battery of claim 10, wherein the nanowires are supported by a conductive substrate.

12. The battery of claim 4, wherein the positive electrode includes a silicon carbide structure formed from nanowires.

13. The battery of claim 2, wherein the closed oxygen conducting membrane comprises:
a stabilized bismuth oxide;
a doped ceria; or
a lanthanum oxide.

14. A method of forming a metal/air battery comprising:
providing a negative electrode;
providing a positive electrode;
providing an oxygen supply;
forming a closed oxygen conducting membrane less than about 50 microns thick; and
positioning the closed oxygen conducting membrane between the oxygen supply and the positive electrode, wherein the closed oxygen conducting membrane is functionally adjacent to the positive electrode.

15. The method of claim 14, wherein forming the closed oxygen conducting membrane comprises conformally forming the closed oxygen conducting membrane.

16. The method of claim 14, wherein forming the closed oxygen conducting membrane comprises forming the closed oxygen conducting membrane by atomic layer deposition.

17. The method of claim 14, wherein forming the closed oxygen conducting membrane further comprises forming the closed oxygen conducting membrane with a nanostructured yttria-stabilized zirconia in a Nernst cell geometry.

18. The method of claim 14, wherein providing the positive electrode comprises:
providing a porous silicon structure; and
forming a porous silicon carbide structure from the porous silicon structure.

19. The method of claim 18, wherein forming the closed oxygen conducting membrane further comprises:
forming the closed oxygen conducting membrane on the porous silicon carbide structure.

20. The battery of claim 5, further comprising:
a separator positioned between the anode and the cathode, the separator separated from the closed oxygen conducting membrane by the positive electrode.

* * * * *